(12) United States Patent
Tilsch

(10) Patent No.: US 6,721,100 B2
(45) Date of Patent: Apr. 13, 2004

(54) SANDWICHED THIN FILM OPTICAL FILTER

(75) Inventor: Markus Tilsch, Santa Rosa, CA (US)

(73) Assignee: JDS Uniphase Corporation, San Jose, CA (US)

(*) Notice: Subject to any disclaimer, the term of this patent is extended or adjusted under 35 U.S.C. 154(b) by 0 days.

(21) Appl. No.: 10/197,865

(22) Filed: Jul. 19, 2002

(65) Prior Publication Data

US 2003/0086176 A1 May 8, 2003

Related U.S. Application Data (60) Provisional application No. 60/345,927, filed on Nov. 7, 2001.

(51) Int. Cl.$^7$ .............................................. G02B 27/00
(52) U.S. Cl. .................. 359/578; 359/579; 359/589; 359/260; 356/454; 356/480; 356/506
(58) Field of Search ................. 359/578, 579, 359/582, 588, 589, 260; 356/454, 480, 506; 385/24

(56) References Cited

U.S. PATENT DOCUMENTS

| | | | | |
|---|---|---|---|---|
| 5,991,027 A | * | 11/1999 | Jacobs-Cook | 356/345 |
| 6,031,653 A | * | 2/2000 | Wang | 359/247 |
| 6,269,202 B1 | * | 7/2001 | Lee | 385/24 |
| 6,600,604 B2 | * | 7/2003 | Gaebe | 359/582 |

* cited by examiner

*Primary Examiner*—Drew Dunn
*Assistant Examiner*—Leo Boutsikaris
(74) *Attorney, Agent, or Firm*—Allen, Dyer, Doppelt, Milbrath & Gilchrist, P.A.

(57) ABSTRACT

Thin film filters have been a basic building block of many wavelength division multiplexed (WDM) systems providing the means by which a signal, defined by a center wavelength, can be separated from a group of WDM signals. In an effort to maintain the same performance over a range of operating temperatures, thin film filters have been coated onto specially designed substrates, which expand and contract with the change in temperature to counteract the effects that the temperature change has on the thin film filters. Unfortunately, only very few materials provide the necessary thermal expansion characteristics to counteract the shift in center wavelength. Moreover, the application of a force onto only one side of the filter causes the thin film filter to bend or curve. Accordingly, the present invention solves the aforementioned problems by providing a thin film filter sandwiched between a substrate and a superstrate, which apply equal forces to each side of the filter. The present invention also includes an actively tunable thin film filter assembly, which utilizes stress applying devices, e.g. heaters or piezo-electric crystals, to adjust signal characteristics, such as the bandwidth, the group delay, and the chromatic dispersion, as desired.

19 Claims, 7 Drawing Sheets

SANDWICHED THIN FILM OPTICAL FILTER

CROSS-REFERENCE TO RELATED APPLICATIONS

The present invention claims priority from U.S. Patent No. 60/345,927 filed Nov. 7, 2001. The present application is also related to pending U.S. patent application Ser. No. 09/644,144 filed Aug. 22, 2000 by Fan et al, and Ser. No. 09/815,916 filed Mar. 23, 2001 by Ryall et al.

TECHNICAL FIELD

The present application relates to a thin film optical filter, and in particular to a thin film filter (TFF) sandwiched between a pair of substrates for rendering the TFF athermal or for providing a means by which the TFF can be actively tuned.

BACKGROUND OF THE INVENTION

Figure 1:
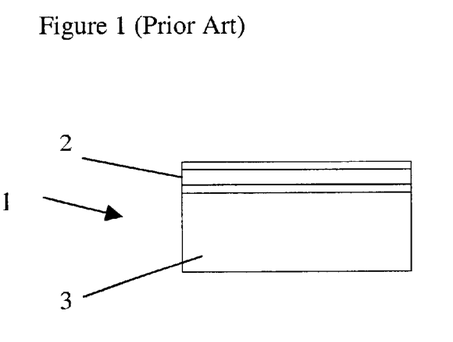
FIG. 1 is a schematic illustration of a conventional thin film filter assembly.

A conventional structure of a thin film interference filter (TFF) assembly 1 is illustrated in FIG. 1, in which a single layer or multiple thin film layers 2 are supported by a substrate 3. Adjacent thin film layers are firmly connected at the interfaces. The substrate 3 and each layer 2 are in a certain stress state based on the manufacturing history and the temperature distribution in the assembly 1. Some components, e.g. substrate 3, layers 2, may be in compression, while others are in tension. For each stress state, each layer 2 has a certain physical thickness and certain optical properties (refractive index, extinction). The stress state also determines the curvature of the surface and interfaces. All these parameters determine the optical response of the assembly 1 when light is incident thereon. When the temperature of the assembly 1 is changed all elements of the system move to a new stress state, which alters the physical thicknesses, the optical properties and the curvature of the system. Accordingly, the optical response of the whole system changes with temperature.

Typically, bandpass filters for light around 1550 nm are needed for telecommunication applications. One important requirement of such a filter is that the center wavelength remains within a specified range over the temperature range of operation. Haruo Takahashi published a paper entitled "Temperature stability of thin-film narrow-bandpass filters produced by ion-assisted deposition" in Applied Opics, Vol. 34, No 4, pp 667–675 on February 1995 relating to how to achieve that goal. The basic idea is to use a substrate with a high coefficient of thermal expansion (CTE). When the temperature of a bandpass filter rises, the thin film layers want to expand and the index of refraction goes up. Both of these effects lead to an increase in the optical thickness and a shifting of the filter towards longer wavelengths. However, if the TFF structure is supported by a substrate that has a higher CTE compared to the thin film materials, the substrate expands further than the thin films and thus stretches the films laterally. Due to the physical effects defined by Poisson's ratio, a rise in temperature can thereby reduce the physical thickness of the TFF layers. The stress state of each layer also reacts to this stretching, therefore, if the right combination of substrate material, substrate thickness and thin film design is used, the system can be made athermal, i.e. the center wavelength remains almost constant over a wide range of temperatures, and active temperature control is not required.

For a device without active temperature control it can be assumed that the optical filter assembly 1 has a homogeneous temperature distribution at all times. The conventional structure acts like a bi-metal when the temperature is changed, whereby the substrate 3 expands or contracts more than the films 2. This leads to a change in curvature of the surface and all interfaces, which impacts the optical properties of the light incident on the filter, and limits how thin of a substrate can be used. Since the substrate is attached to only one side of the filter, not all of the layers are influenced equally by the substrate's expansion, i.e. layers closer to the substrate are stretched more than layers remote therefrom. This disparity leads to gradients through the filter, which causes a curvature in the TFF and results in changes in the optical properties thereof, e.g. bandwidth narrowing.

More recent developments in this field, exemplified by U.S. Pat. No. 6,304,383 issued Oct. 16, 2001 to William Boynton et al, include a second stress applying member positioned on the opposite side of the TFF than the substrate. In these cases the second stress applying means is manufactured out of a vastly different material than the substrate, and requires a central channel therethrough to enable the light to pass. Unfortunately, opposite faces of the TFF still undergo different degrees of stretching, due to the use of a different material on each face. The Boynton patent also discloses an active TFF assembly in which electrostrictive or magnetostrictive layers are provided in the filter for actuation by an electric or magnetic source.

An object of the present invention is to overcome the shortcomings of the prior art by providing a passive athermalized TFF assembly in which a TFF is sandwiched between two similar substrates.

Another object of the present invention is to provide an actively tunable TFF assembly in which a TFF is sandwiched between two substrates, which can place the TFF under stress using controllable means.

SUMMARY OF THE INVENTION

Accordingly, the present invention relates to a thin film filter assembly comprising:

a thin film filter for passing a first signal defined by a first center wavelength through a first side and out from a second side thereof, and for reflecting a second signal defined by a second center wavelength out from the first side thereof;

a substrate mounted on the first side of the thin film filter for supporting the thin film filter thereon, the substrate applying a first force which varies with temperature; and     a superstrate mounted on the second side of the thin film filter for applying a second force to the thin film filter which varies with temperature, the second force being substantially equal to the first force;

whereby the first force and the second force combine to minimize curvature of the assembly and to minimize a shift in the first or second center wavelength caused by a change in temperature thereof.

Another aspect of the present invention relates to a tunable thin film optical filter assembly comprising:

a thin film filter for filtering an optical signal incident thereon;

a substrate mounted on the first side of the thin film filter for supporting the thin film filter thereon, and for applying a first force to the thin film filter which varies with temperature;

a first stress applying means for actively controlling an extra amount of stress applied to the first side of the thin film filter;

a superstrate mounted on the second side of the thin film filter for applying a second force to the thin film filter which varies with temperature;

a second stress applying means for actively controlling an extra amount of stress applied to the second side of the thin film filter;

whereby stress is independently applied to the substrate or the superstrate for tuning a characteristic of a response of the thin film filter.

Another feature of the present invention provides a variable attenuator assembly comprising:

an input waveguide for launching an input beam of light comprising a first signal and a second signal;

a first lens for collimating the input beam of light;

a thin film filter for reflecting a first signal out from a first side thereof, and for passing the second signal through the first side and out from a second side thereof;

a substrate mounted on the first side of the thin film filter for supporting the thin film filter thereon, and for applying a first force to the thin film filter which varies with temperature;

a first stress applying means for actively controlling an extra amount of stress applied to the first side of the thin film filter;

a superstrate mounted on the second side of the thin film filter for applying a second force to the thin film filter which varies with temperature;

a second stress applying means for actively controlling an extra amount of stress applied to the second side of the thin film filter;

an output waveguide for outputting the first signal; and a second lens optically coupled to the thin film filter for focusing the first signal onto the output waveguide;

wherein the thin film filter has a standard curvature for optimally optically coupling the input waveguide to the output waveguide via the first and second lenses; and wherein the first and second stress applying means change the curvature of the thin film filter, thereby attenuating the first signal.

BRIEF DESCRIPTION OF THE DRAWINGS

The invention will be described in greater detail with reference to the accompanying drawings which represent preferred embodiments thereof, wherein.

DETAILED DESCRIPTION

Figure 2:
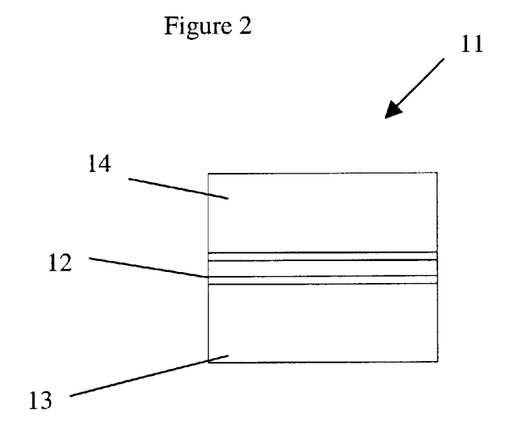
FIG. 2 is a schematic illustration of a passive sandwiched thin film filter assembly according to the present invention.

With reference to FIG. 2, the sandwiched thin film filter (TFF) assembly according to the present invention, generally indicated at 11, includes a TFF 12 sandwiched between a substrate 13 and a superstrate 14. The TFF 12 is coated onto the substrate 13 using standard optical coating techniques. The superstrate 14 can be mounted on the other side of the TFF 12 using index-matched cement or using other known methods, e.g. optical contacting or chemical contacting. Alternatively, the superstrate 14 could be grown on top of the TFF 12 using some form of a deposition technique.

The sandwiched assembly 11 overcomes the curvature problems inherent in the prior art by applying symmetrical forces to both sides of the TFF 12. Ideally, both the substrate 13 and the superstrate 14 are identical in size, shape and material; however, it is possible to construct them from different materials provided they apply similar forces to both sides of the TFF 12 over the operating temperature range. Accordingly, the curvature of the TFF 12 does not change with temperature, and the stress gradients through the various films of the TFF 12 are largely reduced resulting in a much more stable response over the operating temperature range.

Figure 3:
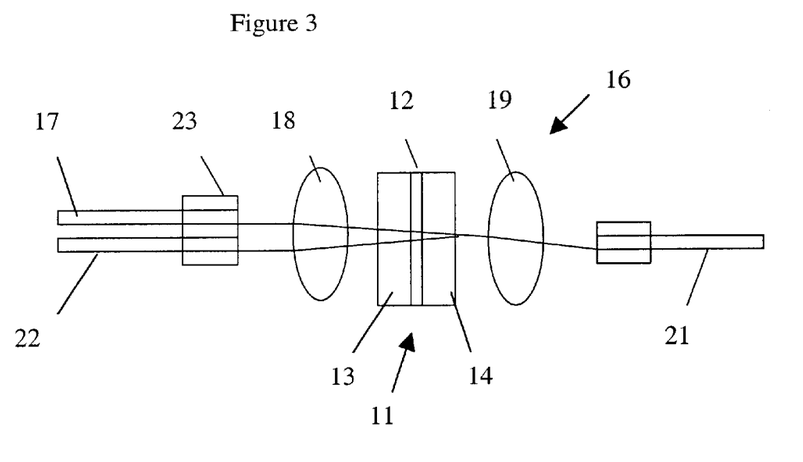
FIG. 3 is a schematic illustration of an optical centerpiece including the thin film filter assembly of FIG. 2.

With reference to FIG. 3, in use, the TFF filter assembly 11 is placed in a wavelength division multiplexed (WDM) optical centerpiece generally indicated at 16, which includes an input waveguide 17, a first lens 18, a second lens 19, a first output waveguide 21, and a second output waveguide 22. Typically the input waveguide 17 and the second output waveguide 22 are optical fibers, the ends of which are encased in a double bore ferrule 23, whereby a single lens 18 can be used to collimate the input beam and focus the reflected output beam. The input light is launched from the input waveguide 17, and collimated by the first lens 18 onto the TFF assembly 11. The light reflected from the TFF assembly 11 is focused by the first lens 18 onto the second output waveguide 22, while the remaining light is passed through the TFF assembly 11, and focused onto the first output waveguide 21 by the second lens 19. Typically, the aforementioned remaining light is a single WDM wavelength channel with a desired center wavelength, which is separated from a plurality of other WDM wavelength channels by the TFF assembly 11. However, the opposite is also possible, whereby the single channel is reflected and the remaining channels are transmitted. In this case, it is the center wavelength of the reflected channel that is effected by a temperature change. The present invention is also applicable for use with filters that separate more than one channel.

The present invention is also applicable for use with any other filter, e.g. a gain flattening filter, that requires a temperature stabilized characteristic spectral feature.

Figure 4:
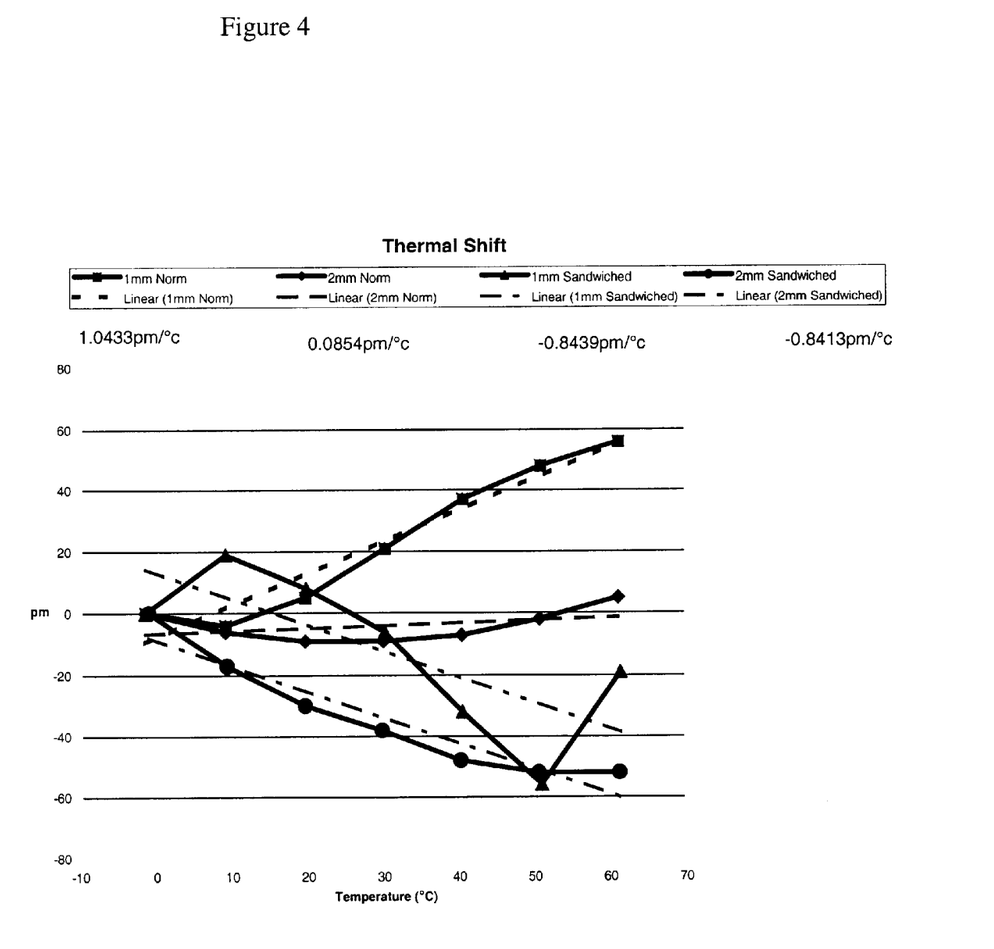
FIG. 4 is a plot of Center Wavelength Shift vs Temperature for various TFF assemblies.

Furthermore, the substrate 13 and the superstrate 14 can be much thinner than expected, because working from both sides on the TFF 12 enhances the influence of the substrate and superstrate material. FIG. 4 illustrates the center wavelength shift of telecom bandpass filters with a total thickness of 1 mm and 2 mm. For both thicknesses, filters of the conventional type and filters of the sandwiched type were measured. The conventional 1 mm thick filter shifted +1.04 pm/deg C. The sandwiched part of equal thickness shifted −0.84 pm/deg C. The conventional 2 mm thick film shifted +0.09 pm/deg C. The sandwiched part of equal thickness shifted −0.84 pm/deg C. The data suggests that the substrate influence is larger in the sandwiched structure, and that the temperature shift coefficients are more negative for the sandwich structure. A major benefit is that substrate/superstrate glasses that would not normally have high enough CTE for the athermalization in the conventional way, can be used in the sandwiched concept. As a result, the choice of substrate material is greatly expanded to include glasses that may have superior optical, chemical or mechanical qualities over the higher CTE glasses. Moreover, the overall thickness of the device can be reduced, i.e. less material can be used, since the substrate/superstrate combination have more effect than the substrate alone.

Additional benefits of the sandwiched assembly 11 result from the fact that the thin film structure 12 is buffered during most of the assembly process. During sawing, dicing and other manufacturing operations damage, primarily at the surfaces, is possible. In a sandwiched assembly the TFF 12 is protected between the substrate 13 and superstrate 14, thereby reducing the possibility of the filter material chipping. During the assembly of some forms of optical couplers, the thin film structure is glued against a GRIN lens or a spacer ring. The expansion of the glue material and the other surfaces influence the thermal shift characteristics of the filter. Small modifications in the manufacturing process can lead to large variations in temperature performance; however, if a sandwiched assembly is used the film is buffered and a much smaller variation can be expected.

Figure 5:
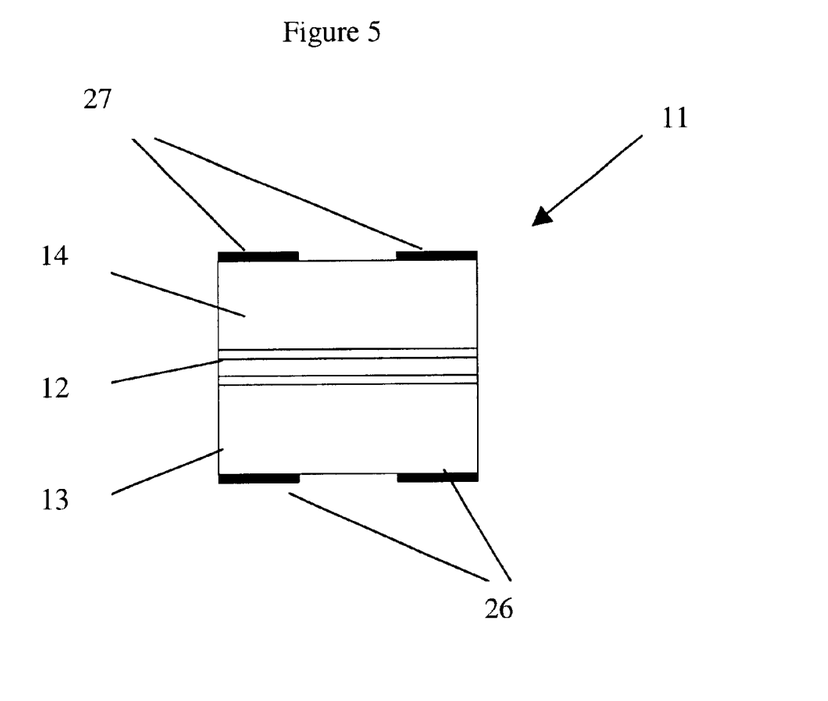
FIG. 5 is a schematic illustration of an active sandwiched thin film filter assembly with temperature controlled tuning according to another aspect of the present invention.

With reference to FIG. 5, it is possible to actively control the temperature or generate a controlled temperature gradient through the TFF assembly 11, by placing temperature controllable devices, e.g. heaters 26 and 27 onto the substrate 13 and a superstrate 14, respectively. Accordingly, the position of the center wavelength can be actively tuned, while obtaining all of the previously described benefits of the sandwiched assembly 11.

Figure 6:
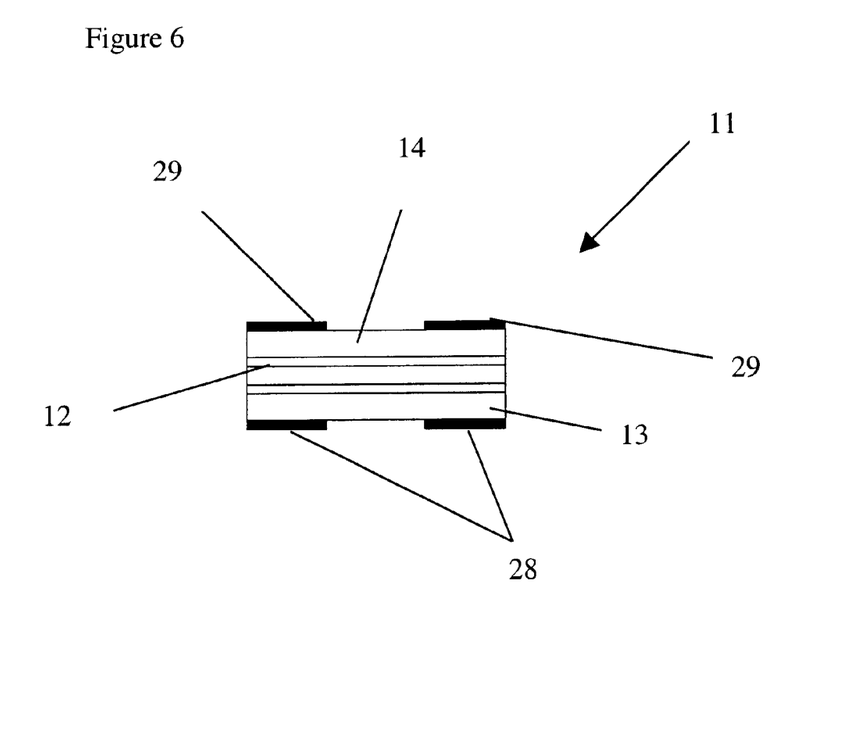
FIG. 6 is a schematic illustration of an active sandwiched thin film filter assembly with piezo-electric controlled tuning according to another aspect of the present invention.

An alternative means for actively controlling the stress applied to both the substrate 13 and the superstrate 14 is by some form of mechanical stress applying means, which applies a stretching or a compressing force thereto. One example of a mechanical stress applying means, as illustrated in FIG. 6, is piezo-electric crystals 28 and 29 mounted directly on the top and bottom (not shown) of the TFF 12 or on the top and bottom, respectively, of the TFF assembly 11. In the latter case, the substrate 13 and the superstrate 14 would have to be relatively thin to translate the necessary forces to the TFF 12. In this case the position of the center wavelength is tuned by varying a voltage applied to the piezo-electric crystals 28 and 29.

Another aspect of the present invention relates to intentionally generating a stress gradient through a stack of thin films 12 by applying unequal forces to the substrate 13 and the superstrate 14. As a consequence of the temperature and/or stress gradient through the stack of thin films 12, a gradient in physical thicknesses and optical properties for the sequence of layers results. Moreover, the curvature of the interfaces between the thin films 12 is also affected. As a result of these changes, the optical response of the assembly will be affected.

If identical materials are used for the substrate 13 and the superstrate 14, then applying a temperature gradient through the assembly 11 generates a stress gradient, e.g. heating the substrate 13 more than the superstrate 14. If different materials are used for both the substrate 13 and the superstrate 14, then a stress gradient can be generated even if both the substrate 13 and the superstrate 14 are heated homogeneously. Constructing the substrate 13 and the superstrate 14 out of different materials can greatly enhance the response, and provides much more freedom to tailor a system to meet differing needs.

To illustrate the various properties tunable with this arrangement, we will make the following assumption about how much optical thickness gradient in a TFF can be generated through a temperature gradient. If the proper choice of substrate and superstrate material, e.g. glass, and thin film material is made, the assembly can easily have a thermal center wavelength shift of approximately 5 pm/° C. for a filter centered around 1550 nm. The center wavelength shift is related to the optical thickness change of the layers. Accordingly, if the substrate was athermal and the superstrate shifted 5 pm/° C., a relative gradient of 5 pm/1550 nm/° C. in optical thickness throughout the filter would be generated. Therefore, a temperature gradient of 50° C. would generate a relative optical thickness gradient of 0.16 pm/nm over the filter.

Figure 7:
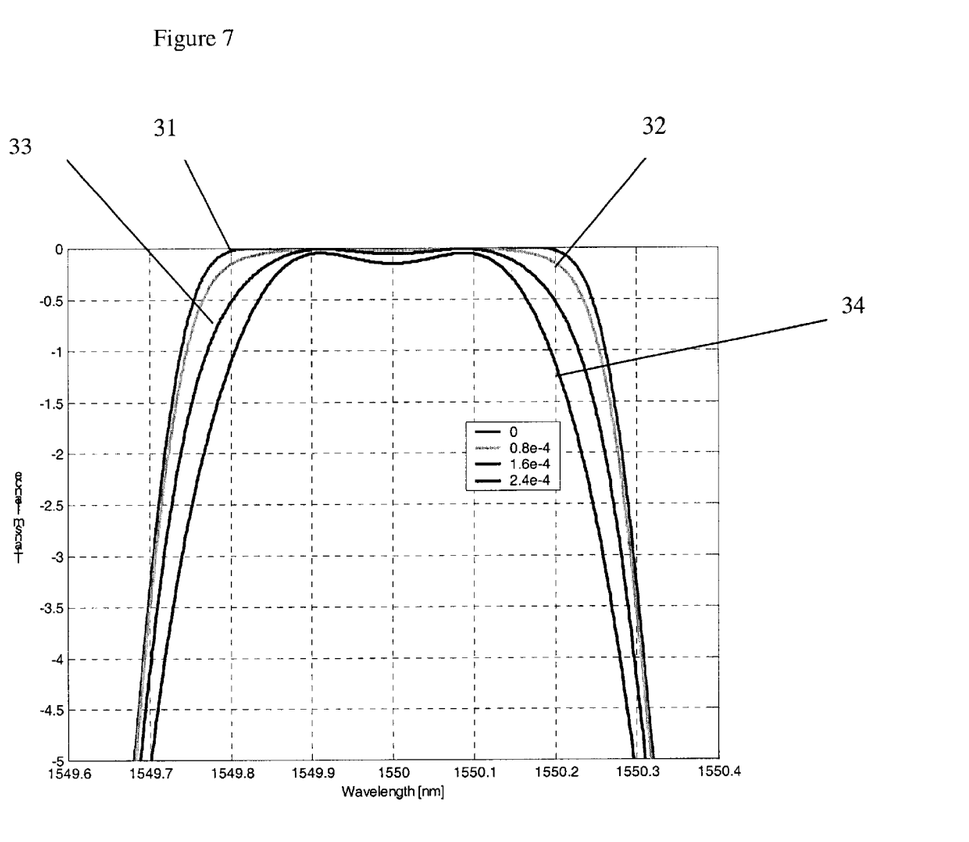
FIG. 7 is a plot of Transmittance vs Wavelength for various relative optical thickness gradients.

FIG. 7 illustrates how the bandwidth of a 100 GHz narrow bandpass filter can be tuned using the aforementioned principle. A gradient in optical properties results in a mismatch between the cavities in the bandpass filter, which results in a bandwidth reduction. In FIG. 7, the transmission performance of the filter is illustrated for four relative optical thickness gradients including 0 (perfectly matched) represented by line 31, 0.08 pm/nm represented by line 32, 0.16 pm/nm represented by line 33, and 0.24 pm/nm represented by line 34.

Figure 8:
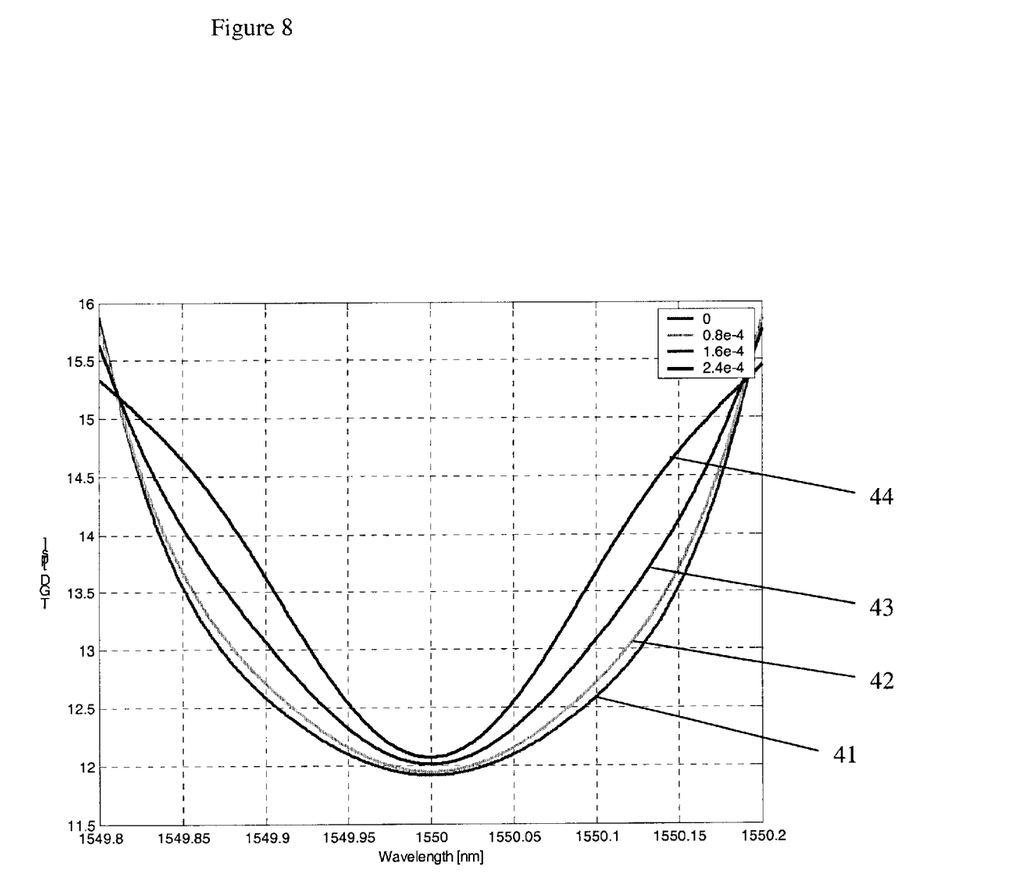
FIG. 8 is a plot of Group Delay vs Wavelength for various relative optical thickness gradients.

Similarly, as illustrated by FIG. 8, the group delay of a narrow bandpass filter can also be tuned. The plot illustrates the same four relative optical thickness gradients as FIG. 7 represented by lines 41, 42, 43 and 44, respectively.

Figure 9:
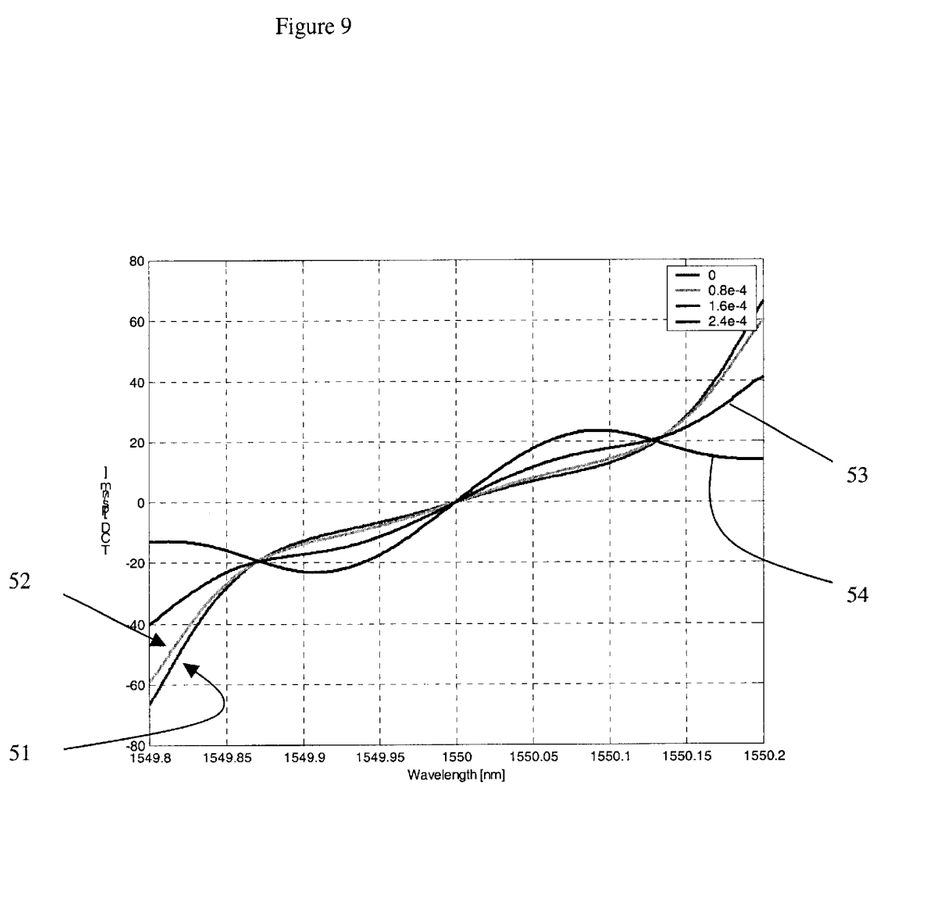
FIG. 9 is a plot of Chromatic Dispersion vs Wavelength for various relative optical thickness gradients.

FIG. 9 illustrates the effect of varying the relative optical thickness gradients has on chromatic dispersion. The lines 51, 52, 53 and 54 represent the relative optical thickness gradients 0, 0.08, 0.16 and 0.24 pm/nm, as above.

The same principle can be applied to gain flattening filters. Tuning of the filter impacts the transmittance and reflectance of the system. The effect can be used to minimize the excursion in an optical amplifier.

Figure 10A:
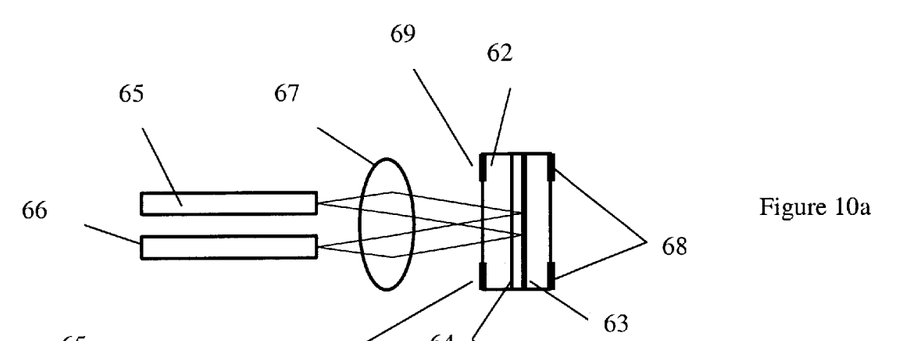
FIGS. 10a and 10b are schematic illustrations of a variable optical attenuator according to another embodiment of the present invention.
Figure 10B:
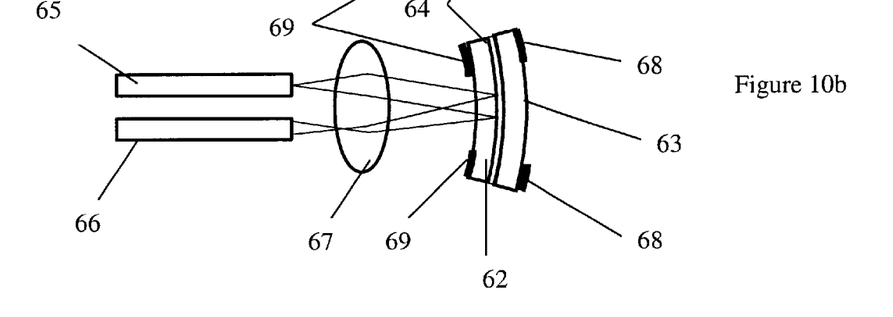

The applications so far utilize the gradients in film thickness and optical properties for tuning various properties of light. The stress state of the whole system also physically changes the curvature of the interfaces and surface of the thin films. These changes can be used to adjust the coupling efficiency of an optical fiber coupling system. An example application for this approach would be a variable attenuator as shown in FIGS. 10a and 10b. FIG. 10a illustrates an optical fiber coupling system with a standard TFF assembly 61 including a substrate 62, a superstrate 63 and a TFF 64 for reflecting a signal from an input fiber 65 to an output fiber 66 via a lens 67. Stress applying devices 68 and 69 as hereinbefore described are provided for adjusting the curvature of the TFF 64. In FIG. 10b, a stress gradient is generated by the stress applying devices 68 and 69 to adjust the curvature of the TFF 64 surfaces and interfaces, which reduces the coupling efficiency of the system, i.e. the lens 67 is unable to focus all of the light onto the output fiber 66. The light rays will either focus and then begin to disperse before hitting the output fiber 66 or some of the light will be captured in the output fiber 66 before all of the light has the chance to focus. Accordingly, variable attenuation can be provided by varying the stress gradient in the TFF assembly 61.

What is claimed is:

1. A thin film filter assembly comprising:

a thin film filter for a first signal defined by a first center wavelength through a first side and out from a second side thereof, and for reflecting a second signal defined by a second center wavelength out from the first side thereof;

a substrate mounted on the first side of the thin film filter for supporting the thin film filter thereon, the substrate applying a first force which varies with temperature; and a superstrate mounted on the second side of the thin film filter for applying a second force to the thin film filter which varies with temperature, the second force being substantially equal to the first force;

whereby the first force and the second force combine to minimize curvature of the assembly and to minimize shift of the first or second center wavelength caused by a change in temperature of the assembly.

2. The assembly according to claim 1, wherein the substrate and the superstrate have substantially the same dimensions, and are manufactured from substantially the same material.

3. The assembly according to claim 1, further comprising:

first stress applying means for actively controlling the amount of stress applied to the first side of the thin film filter; and second stress applying means for actively controlling the amount of stress applied to the second side of the thin film filter.

4. The assembly according to claim 3, wherein each of the first and second stress applying means includes a heater for thermally expanding or contracting the substrate and the superstrate, respectively.

5. The assembly according to claim 3, wherein each of the first and second stress applying means includes a mechanical stress applying means.

6. The assembly according to claim 5, wherein the mechanical stress applying means includes a piezo-electric crystal.

7. The assembly according to claim 5, wherein one of the mechanical stress applying means is mounted between the substrate and the first side of the thin film filter or on a face of the substrate remote from the thin film filter.

8. The assembly according to claim 1, further comprising:

an input waveguide for launching an input beam of light including the first and second signals;

a first output waveguide for outputting the first signal;

a second output waveguide for outputting the second signal;

a first lens for collimating the input beam of light onto the thin film filter;

a second lens for focusing the first signal onto the first output waveguide; and a third lens for focusing the second signal onto the second output waveguide.

9. A tunable thin film optical filter assembly comprising:

a thin film filter for filtering an optical signal incident thereon;

a substrate mounted on the first side of the thin film filter for supporting the thin film filter thereon, and for applying a first force to the thin film filter which varies with temperature;

a first stress applying means for actively controlling an extra amount of stress applied to the first side of the thin film filter;

a superstrate mounted on the second side of the thin film filter for applying a second force to the thin film filter which varies with temperature;

a second stress applying means for actively controlling an extra amount of stress applied to the second side of the thin film filter;

whereby stress may be independently applied to the substrate or the superstrate for tuning a characteristic of a response of the thin film filter.

10. The assembly according to claim 9, wherein the characteristic is selected from the group consisting of bandwidth, group delay, and chromatic dispersion.

11. The assembly according to claim 9, wherein each of the first and second stress applying means includes a heater for thermally expanding or contracting the substrate and the superstrate, respectively.

12. The assembly according to claim 9, wherein each of the first and second stress applying means includes a mechanical stress applying means.

13. The assembly according to claim 12, wherein the mechanical stress applying means includes a piezo-electric crystal.

14. The assembly according to claim 12, wherein one of the mechanical stress applying means is mounted between the substrate and the first side of the thin film filter or on a face of the substrate remote from the thin film filter.

15. A variable attenuator assembly comprising:

an input waveguide for launching an input beam of light comprising a first signal and a second signal;

a first lens for collimating the input beam of light;

a thin film filter for reflecting a first signal out from a first side thereof, and for passing the second signal through the first side and out from a second side thereof;

a substrate mounted on the first side of the thin film filter for supporting the thin film filter thereon, and for applying a first force to the thin film filter which varies with temperature;

a first stress applying means for actively controlling an extra amount of stress applied to the first side of the thin film filter;

a superstrate mounted on the second side of the thin film filter for applying a second force to the thin film filter which varies with temperature;

a second stress applying means for actively controlling an extra amount of stress applied to the second side of the thin film filter;

an output waveguide for outputting the first signal; and a second lens optically coupled to the thin film filter for focusing the first signal onto the output waveguide;

wherein the thin film filter has a standard curvature for optimally optically coupling the input waveguide to the output waveguide via the first and second lenses; and wherein the first and second stress applying means change the curvature of the thin film filter, thereby attenuating the first signal.

16. The assembly according to claim 15, wherein each of the first and second stress applying means includes a heater for thermally expanding or contracting the substrate and the superstrate, respectively.

17. The assembly according to claim 15, wherein each of the first and second stress applying means includes a mechanical stress applying means.

18. The assembly according to claim 17, wherein the mechanical stress applying means includes a piezo-electric crystal.

19. The assembly according to claim 17, wherein one of the mechanical stress applying means is mounted between the substrate and the first side of the thin film filter or on a face of the substrate remote from the thin film filter.

* * * * *